United States Patent
Im et al.

(10) Patent No.: US 9,235,055 B2
(45) Date of Patent: Jan. 12, 2016

(54) LIGHT SOURCE ASSEMBLY AND DISPLAY APPARATUS HAVING THE SAME

(75) Inventors: Hyun-Deok Im, Seoul (KR); Guk-Hyun Kim, Yongin-si (KR); Jung-Hyun Cho, Suwon-si (KR); Moon-Jung Baek, Suwon-si (KR); Byoung-Ho Cheong, Yongin-si (KR); Seong-Mo Hwang, Seongnam-si (KR); Oleg Prudnikov, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 521 days.

(21) Appl. No.: 13/590,741

(22) Filed: Aug. 21, 2012

(65) Prior Publication Data
US 2013/0235287 A1    Sep. 12, 2013

(30) Foreign Application Priority Data

Mar. 8, 2012    (KR) .......................... 10-2012-0023691

(51) Int. Cl.
| G02F 1/1335 | (2006.01) |
| G02B 27/22 | (2006.01) |
| F21V 8/00 | (2006.01) |

(52) U.S. Cl.
CPC .......... *G02B 27/2214* (2013.01); *G02B 6/0038* (2013.01); *G02B 6/0045* (2013.01); *G02B 6/0053* (2013.01); *G02B 6/0068* (2013.01); *G02B 6/0073* (2013.01); *G02F 1/133615* (2013.01)

(58) Field of Classification Search
CPC .............. G02F 1/133615; G02F 2001/133607; G02B 27/2214
USPC .................................. 349/62, 65, 15; 362/606
See application file for complete search history.

(56) References Cited

U.S. PATENT DOCUMENTS

| 7,430,028 | B2 | 9/2008 | Tsai et al. | |
| 7,660,047 | B1* | 2/2010 | Travis et al. | 359/726 |
| 2005/0248960 | A1* | 11/2005 | Yamashita et al. | 362/611 |
| 2009/0213300 | A1* | 8/2009 | Daiku | 349/65 |
| 2009/0316072 | A1* | 12/2009 | Okumura et al. | 349/64 |

FOREIGN PATENT DOCUMENTS

| JP | 4600218 | 10/2010 |
| KR | 10-2007-0120825 | 12/2007 |
| KR | 10-2011-0000698 | 1/2011 |

* cited by examiner

*Primary Examiner* — Thanh-Nhan P Nguyen
(74) *Attorney, Agent, or Firm* — H.C. Park & Associates, PLC

(57) ABSTRACT

A light source assembly including a light source part, a light guide plate and a light-condensing sheet. The light source assembly generates light and includes at least one light source. The light guide plate includes an incident surface to which the light is incident, an opposing surface which is opposite to the incident surface, and an exiting surface which emits the light, and has a thickness which is gradually increased from the incident surface to the opposing surface. The light-condensing sheet includes a plurality of reverse prism patterns which protrude toward the exiting surface, extend along an arc of a circle, and are arranged in a concentric circle structure.

19 Claims, 14 Drawing Sheets

LEFT-RIGHT VIEWING ANGLE [deg.]

LIGHT SOURCE ASSEMBLY AND DISPLAY APPARATUS HAVING THE SAME

CROSS REFERENCE TO RELATED APPLICATIONS

This application claims priority from and the benefit of Korean Patent Application No. 10-2012-0023691, filed on Mar. 8, 2012, which is hereby incorporated by reference for all purposes as if fully set forth herein.

BACKGROUND OF THE INVENTION

1. Field

Exemplary embodiments of the present invention relate to a light source assembly and a display apparatus having the above-mentioned light source assembly. More particularly, exemplary embodiments of the present invention relate to a light source assembly for increasing a display quality and a display apparatus having the above-mentioned light source assembly.

2. Discussion of the Background

Generally, a display apparatus includes a display panel displaying an image and a backlight assembly providing light to the display panel.

The backlight assembly may utilize various kinds of light sources. Recently, a light emitting diode ("LED") has been typically applied to small electronic devices.

The backlight assembly may be classified as either an edge-illumination type or a direct-illumination type according to the position of the light sources. In the backlight assembly of the edge-illumination type, a light guide plate for guiding light is disposed adjacent to the light sources. In particular, the light guide plate guides a light from the light emitting diode and planarly emits the light. Since an exit angle of the light emitted from the backlight assembly is generally constant, a user's demands for using display devices in various conditions may be difficult to satisfy. A narrow view angle is required when the display device is personally used, and a wide view angle is required when many people use the display device together. However, the view angle is usually not easy to change.

Moreover, in order to form various viewing angles, a light surface opposing an incident light surface of a light guide plate is formed as a spherical minor shape, and the incident light is changed to parallel light. Thus, a view angle distribution may be adjusted actively. However, because the spherical minor shape of the opposed light surface is disposed faraway from an effective display area of the display panel, the size of the display apparatus is increased and the depth of the bezel is increased.

SUMMARY

Exemplary embodiments of the present invention provide a light source assembly capable of adjusting a light emitting distribution.

Exemplary embodiments of the present invention also provide a display apparatus including the light source assembly.

Additional features of the invention will be set forth in the description which follows, and in part will be apparent from the description, or may be learned by practice of the invention.

An exemplary embodiment of the invention discloses a light source assembly, the light source assembly including a light source part, a light guide plate and a light-condensing sheet. The light source assembly generates light and includes at least one light source. The light guide plate includes an incident surface to which the light is incident, an opposing surface which is opposite the incident surface, and an exiting surface which emits the light, and has a thickness which gradually increases from the incident surface to the opposing surface, such as a wedge shape. The light-condensing sheet includes a plurality of reverse prism patterns which protrude toward the exiting surface, extend along an arc of a circle, and are arranged in a concentric circle structure.

An exemplary embodiment of the present invention also discloses a display apparatus. The display apparatus includes a display panel and a light source assembly. The display panel displays an image. The light source assembly includes a light source part generating light and including a plurality of light emitting diodes, a light guide plate including an incident surface to which the light is incident, an opposing surface which is opposite the incident surface, and an exiting surface which emits the light. The light guide plate has a thickness which gradually increases from the incident surface toward the opposing surface, such as a wedge shape. The light source assembly also includes a light-condensing sheet including a plurality of reverse prism patterns which protrude toward the exiting surface, extend along an arc of a circle, and are arranged as a concentric circle structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 14A is a schematic diagram illustrating a method of driving the 2D/3D switching panel in the2D mode, and FIG. 14B is a graph illustrating the luminance distribution of the 2D image in the 2D mode.

FIG. 15A is a schematic diagram illustrating a method of driving the 2D/3D switching panel in the 3D mode, and FIG. 15B is a graph illustrating the luminance distribution of the 3D image in the 3D mode.

DETAILED DESCRIPTION OF THE ILLUSTRATED EMBODIMENTS

Figure 1:
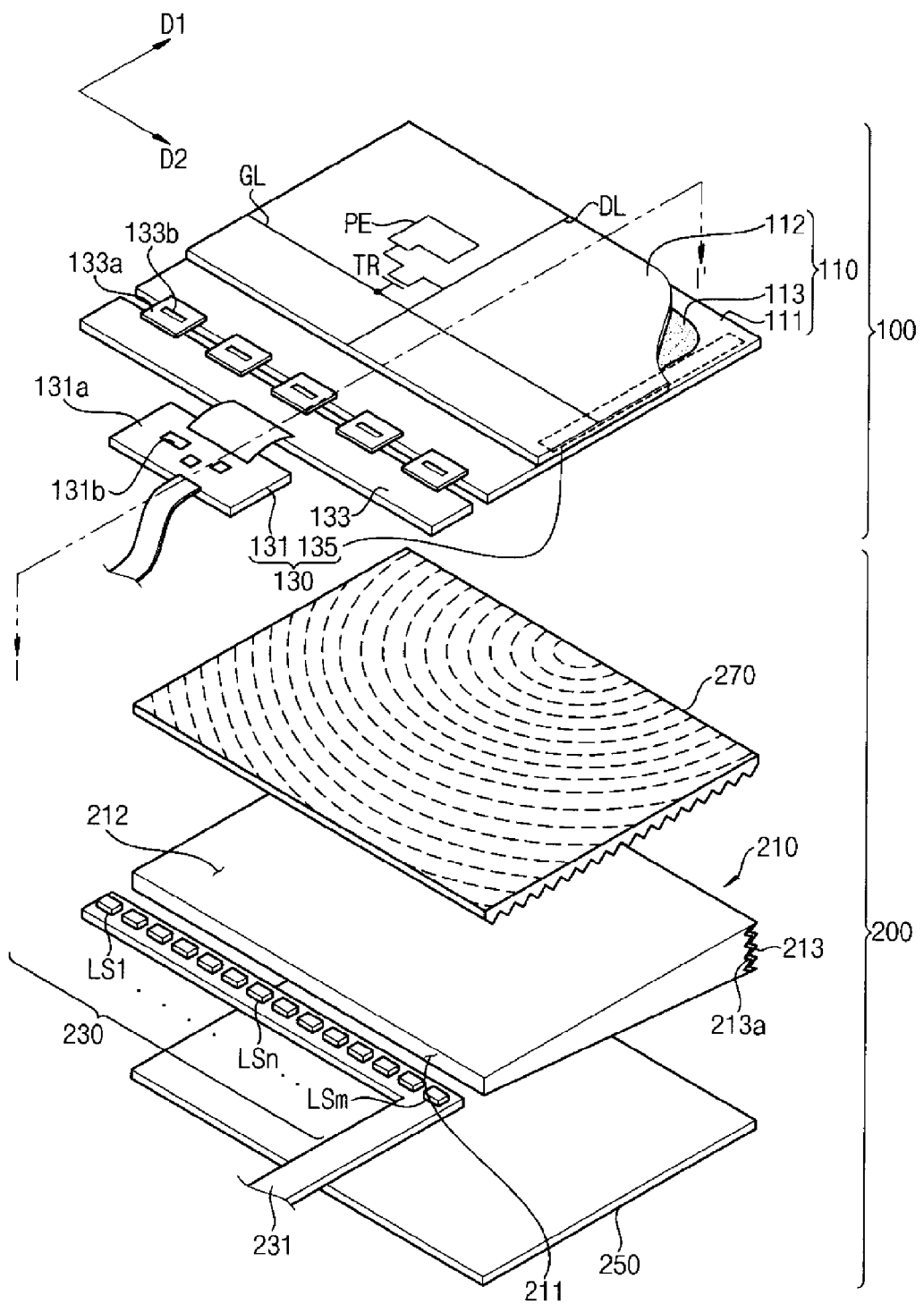
FIG. 1 is an exploded perspective view according to an exemplary embodiment of a display apparatus according to the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
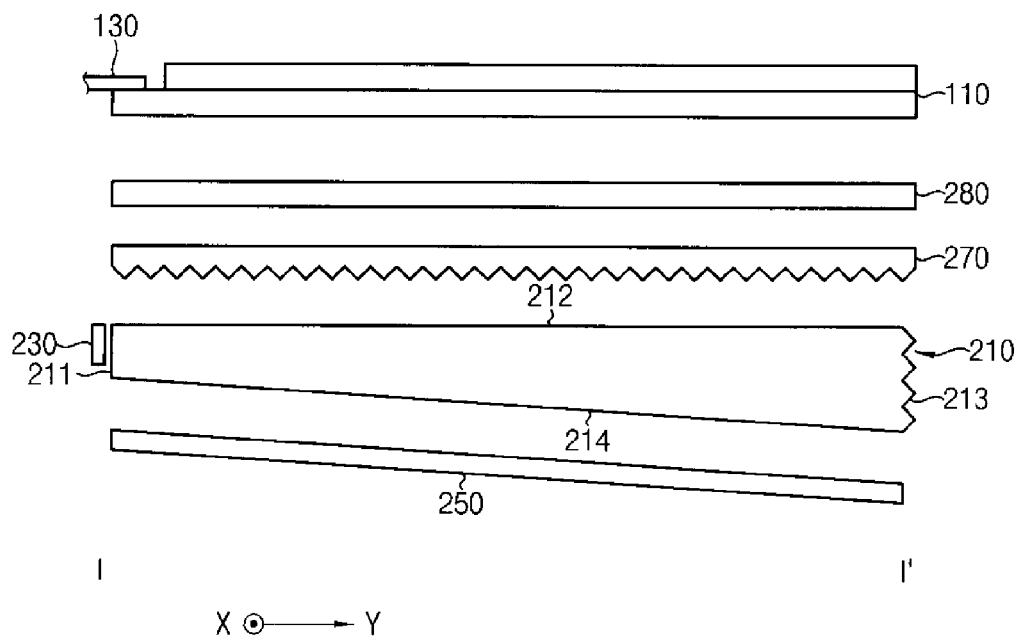
FIG. 2 is a cross-sectional view illustrating the display apparatus in FIG. 1.

FIG. 1 is an exploded perspective view according to an exemplary embodiment of a display apparatus of the present invention. FIG. 2 is a cross-sectional view illustrating the display apparatus in FIG. 1.

Referring to FIGS. 1 and 2, the display apparatus includes a panel assembly 100 and a light source assembly 200.

The panel assembly 100 includes a display panel 110 and a driving part 130.

The display panel 110 includes a display substrate 111, an opposing substrate 112 and a liquid crystal layer 113. The display substrate 111 includes a plurality of data lines DL, a plurality of gate lines GL, a plurality of pixel switching elements TR and a plurality of pixel electrodes PE. The data lines DL extend in a first direction D1 and are arranged in a second direction D2 crossing the first direction D1. The gate line GL extend in the second direction D2 and are arranged in the first direction D1. The pixel switching elements TR are connected to the data lines DL and the gate lines GL. The pixel electrodes PE are connected to the pixel switching elements TR.

The opposing substrate 112 opposes the display substrate 111. The opposing substrate 112 may include a plurality of color filters (red, green, blue, and so on) and a common electrode.

The liquid crystal layer 113 is disposed between the display substrate 111 and the opposing substrate 112, and may be driven based on data voltages applied to the pixel electrodes PE.

The driving part 130 includes a main circuit part 131, a data circuit part 133 and a gate circuit part 135. The main circuit part 131includes a printed circuit board 131a and a plurality of driving chips 131b mounted on the printed circuit board 131a. The main circuit part 131 generates control signals which control the data circuit part 133 and the gate circuit part 135. In addition, the main circuit part 131 also generates control signals which control the light source assembly 200 according to an operation mode of the display apparatus. In one exemplary embodiment, when the display apparatus is displayed in a public mode, the display apparatus has a wide view angle so that many observers may see the image displayed on the display apparatus. In the public mode, the main circuit part 131 drives the light source assembly 200 into a wide exit angle mode which emits light having a wide exit angle distribution. In addition, when the display apparatus is displayed in a private mode, the display apparatus has a narrow view angle so that a single observer may see the image displayed on the display apparatus. In the private mode, the main circuit part 131 drives the light source assembly 200 into a narrow exit angle mode which emits light having a narrow exit angle distribution.

The data circuit part 133 includes a flexible printed circuit board ("FPCB") 133a mounted on the display substrate 111 and a source driving chip 133b mounted on the FPCB 133a. The data circuit part 133 provides a data signal to the data line DL.

The gate circuit part 135 is directly formed on the display substrate 111. The gate circuit part 135 includes a plurality of circuit switching elements, and the circuit switching elements may be directly formed on the display substrate 111 via a process which is substantially the same as that forming the pixel switching element TR. Although not shown in the figures, the gate circuit part 135 may include a FPCB mounted on the display substrate 111 and a gate driving chip mounted on the FPCB, such as the data circuit part 133.

The light source assembly 200 includes a light guide plate ("LPG") 210, a light source part 230, a reflection sheet 250 and a light-condensing sheet 270.

The LGP 210 includes an incident surface 211, an exiting surface 212, an opposing surface 213 and a rear surface 214. The light guide plate 210 has a wedge shape in a cross-sectional view shown in FIG. 2, which is gradually increased in thickness from the incident surface 211to the opposing surface 213.

The incident surface 211 is adjacent to the light source part 230, and receives light generated from the light source part 230. The exiting surface 212 opposes a back surface of the display panel 110, and emits light guided from the LGP 210 toward the display panel 110. The opposing surface 213 opposes the incident surface 211, and includes a reflection layer 213a which reflects light which is incident to the incident surface 211 and passes through the LGP 210 and arrives at the opposing surface 213. The reflective layer 213a may be formed by various methods. In one exemplary embodiment, for example, the reflective layer 213a may be formed by depositing a metal at the opposing surface 213. The metal may include silver, such as included in a mirror, aluminum, chrome, nickel and so on. The opposing surface 213 may be formed in a zig-zag pattern or a convexo-concave pattern for improving reflectance. The rear surface 214 opposes the exiting surface 212, and is connected to the incident surface 211 and the opposing surface 213 so as to define a corner of the LGP 210.

A meeting line where the exiting surface 212 and the opposing surface 213 meet is a substantially straight line. The LGP 210 is a substantially rectangular shape in a plan view. The LGP 210 converts point light source or line light source distribution into a planar light source distribution.

The light source part 230 includes at least one light source emitting the light, and is disposed adjacent to the incident surface 210a. In one exemplary embodiment, for example, the light source part 230 may include on a printed circuit board ("PCB") 231 and a plurality of light emitting diodes ("LEDs") LS1, . . . LSn, . . . , LSm which are mounted on the PCB 231 (where n and m are natural numbers).

The LEDs LS1, . . . LSn, . . . , LSm may be selectively driven according to an operation mode of the display apparatus. In one exemplary embodiment, for example, in the wide exit angle mode, the LEDs LS1, . . . LSn, . . . , LSm which are arranged along a longitudinal direction of the incident surface 211, all emit. In the narrow exit angle mode, at least one LED which is disposed adjacent to a central area of the incident surface 211, emits. The narrow exit angle mode may be departmentalized according to an observer's environment. For example, when the observer is located within a building, a subway, an airplane and so on, the people may be around the observer. Thus, the number of the LEDs, which are disposed adjacent to the central area of the incident surface 211 and emit the light, is adjusted so that the narrow exit angle mode may be departmentalized.

The reflection sheet 250 is disposed adjacent to the rear surface 214 of the LGP 210. The reflection sheet 250 reflects the light leakage from the LGP 210 back to the LGP 210.

The light-condensing sheet 270 is disposed adjacent the exiting surface 212 of the LGP 210 and collects the light emitted from the exiting surface 212. The light-condensing sheet 270 includes a plurality of reverse prism patterns which are formed on a surface opposite the exiting surface 212. The reverse prism patterns extend along an arc of a circle and are arranged in a concentric circle structure. The light-condensing sheet 270 may perform functions such as a reverse prism sheet and a light-condensing sheet.

The display apparatus may further include a diffusion sheet 280.

The diffusion sheet 280 may be disposed between the light-condensing sheet 270 and the display panel 110. The diffusion sheet 280 uniformly diffuses the light emitted from the light-condensing sheet 270 toward the display panel 110.

Figure 3A:
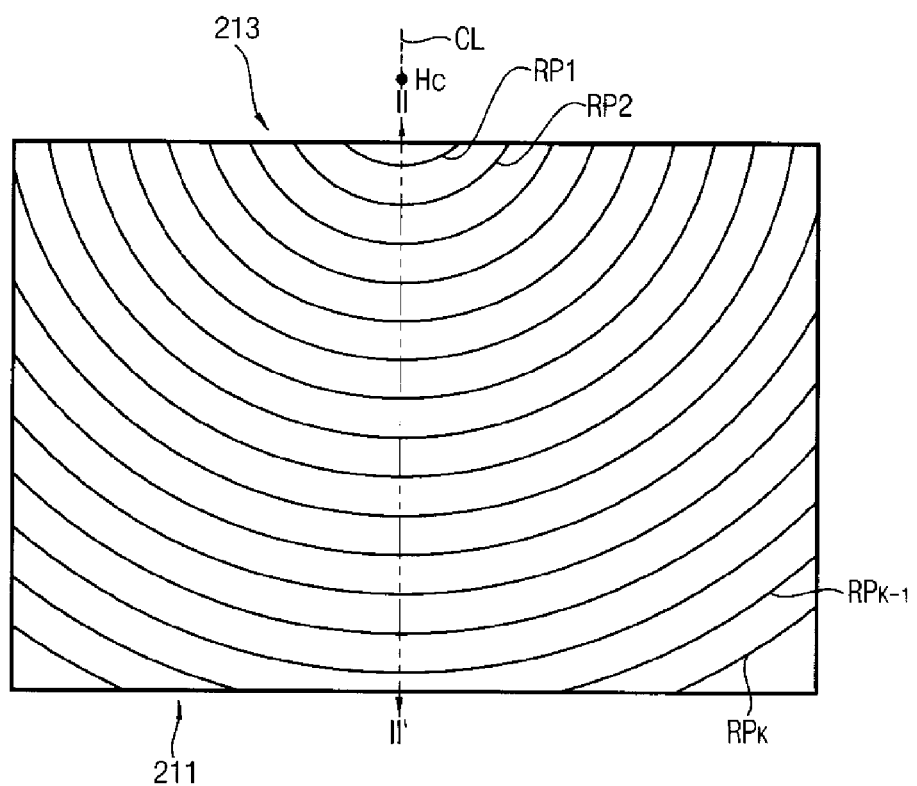
FIGS. 3A and 3B are a plan view and a cross-sectional view illustrating a condensing light sheet in FIG. 1.
Figure 3B:
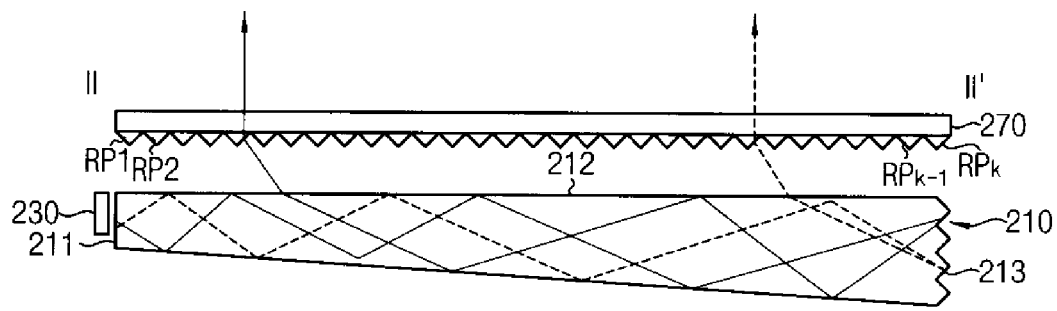

FIGS. 3A and 3B are a plan view and a cross-sectional view, respectively illustrating a condensing light sheet in FIG. 1.

Referring to FIGS. 1, 3A and 3B, the light-condensing sheet 270 includes a plurality of reverse prism patterns RP1, . . . , RPk.

Each of the reverse prism patterns RP1, . . . , RPk includes a prism pattern protruding toward the exiting surface 212 of the LGP 210. A first reverse prism pattern RP1 is disposed adjacent to the opposing surface 213 of the LGP 210 and a k-th reverse prism pattern RPk is disposed adjacent to incident surface 211 of the LGP 210.

A prism having the first reverse prism pattern RP1 extends along the arc of a first circle. A central axis Hc of the first circle is on a central line extending in a direction which crosses the longitudinal direction of the incident surface 211.

A prism having the second reverse prism pattern RP2 extends along an arc of a second circle larger than that of the first circle corresponding to the first reverse prism pattern RP1. The second circle has the same central axis Hc as the first circle.

A prism of the k-th reverse prism pattern RPk extends along an arc of the k-th circle larger than that of a (k−1)-th circle corresponding to the (k−1)-th reverse prism pattern. The k-th circle has the same central axis Hc as the (k−1)-th circle.

As described above, the prisms of the first to k-th reverse prism patterns RP1, . . . , RPk extend along arcs of concentric circles, and the arcs of the concentric circles are gradually increased in radius from the opposing surface 213 to the incident surface 211.

A thickness of the LGP 210 gradually increases from the incident surface 211 to the opposing surface 213, forming the wedge shape shown in a cross-sectional view in FIG. 2. Thus, the light received from the incident surface 211 is totally reflected at the exiting surface 212 and the rear surface slanted 214 as the wedge shape and proceeds toward the opposing surface 213. The light proceeding toward the opposing surface 213 is reflected at a reflection structure, such as a zig-zag pattern, the reflection layer, and so on, and proceeds toward the incident surface 211.

A total reflection angle may be decreased because of the slanted angle of the LGP 210 having the wedge shape. When the total reflection angle of the light proceeding toward the incident surface 211 is outside of a critical angle range, the light proceeding toward the incident surface 211 exits the LGP 210 through the exiting surface 212 of the LGP 210.

The light emitted from the exiting surface 212 is condensed by the reverse prism patterns RP1, . . . , RPk of the light-condensing sheet 270.

Figure 4A:
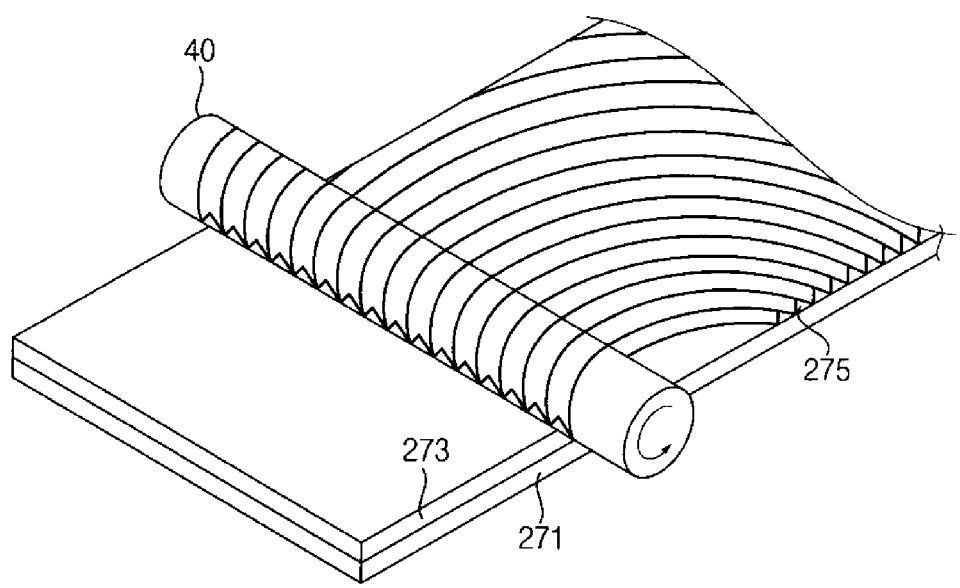
FIGS. 4A and 4B are schematic diagrams illustrating the method of manufacturing the light-condensing sheet in FIG. 1.
Figure 4B:
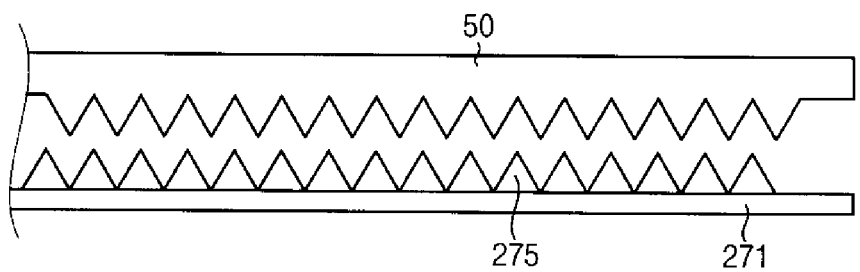

FIGS. 4A and 4B are schematic diagrams illustrating the method of manufacturing the light-condensing sheet in FIG. 1.

Referring to FIGS. 3A and 4A, the light-condensing sheet 270 may be manufactured using a former roller 40. In one exemplary embodiment, for example, a resin material is formed on a base substrate 271. A former roller which has a former pattern corresponding to the prism pattern is rolled on the resin material so that the prism pattern 275 is formed on the base substrate 271.

Alternatively, referring to FIGS. 3A and 4B, the light-condensing sheet 270 may be manufactured using a compression former process. In one exemplary embodiment, for example, a resin material is formed on a base substrate 271. The resin material is compressed into a former mode 50 which has a former pattern corresponding to the prism pattern, so that the prism pattern 275 is formed on the base substrate 271.

As described above, the light-condensing sheet 270 may be manufactured, but is not limited to the methods thereto.

Figure 5:
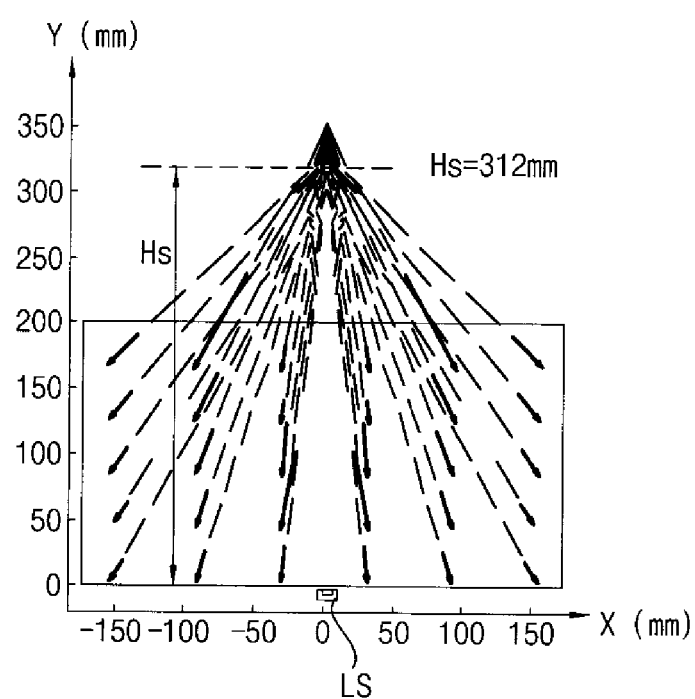
FIG. 5 is a schematic diagram illustrating a light emitting distribution of a light guide plate in FIG. 2.
Figure 6:
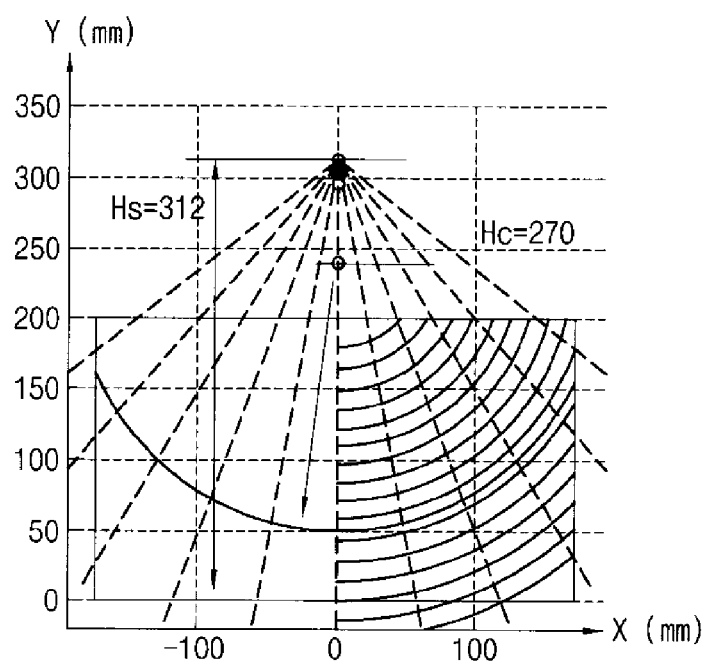
FIG. 6 is a schematic diagram illustrating a reverse prism pattern of the light-condensing sheet in FIG. 2.

FIG. 5 is a schematic diagram illustrating a light emitting distribution of the light guide plate shown in FIG. 2. FIG. 6 is a schematic diagram illustrating a reverse prism pattern of the light-condensing sheet shown in FIG. 2.

Referring to FIGS. 2, 5 and 6, the light-condensing sheet 270 according to the present exemplary embodiment, has an optical pattern for condensing the light in the narrow exit angle mode.

Table 1 is simulation data for an exit angle θ of the light emitted from the exiting surface 213 when one light source LS adjacent to the central area of the incident surface 211 emits the light.

TABLE 1

| x [mm] | θ [deg] | | | | |
|---|---|---|---|---|---|
|  | y = 20 | y = 50 | y = 100 | y = 150 | y = 180 |
| 10 | 2.03 | 2.2 | 2.58 | 3.14 | 3.66 |
| 20 | 4.06 | 4.4 | 5.15 | 6.28 | 7.3 |
| 40 | 8.1 | 8.78 | 10.27 | 12.5 | 14.51 |
| 80 | 16.1 | 17.4 | 20.3 | 24.58 | 28.35 |
| 120 | 23.94 | 25.83 | 29.92 | 35.88 | 41.03 |
| 160 | 31.53 | 33.93 | 39.02 | 46.25 | 52.33 |
| h* [mm] | 275.5 ± 2.8 | 253 ± 2.9 | 214 ± 3 | 173 ± 3.2 | 146 ± 3.5 |
| F [mm] | 163 | 155 | 139.6 | 120.8 | 107 |

Referring to Table 1 and FIG. 5, when an X-axis direction is referred to as the longitudinal direction and an Y-axis direction is referred to as a direction proceeding from the incident surface 211 of the LGP 210 to the opposing surface 213 of the LGP 210, the exit angle θ corresponding to X and Y-coordinates of the exiting surface 212 is calculated.

Referring to Table 1, when the X and Y coordinates are (10 mm, 20 mm), the exit angle θ is about 2.03 degrees. When the X and Y coordinates are (10 mm, 180 mm), the exit angle θ is about 3.66 degrees. When the X and Y coordinates are (40 mm, 100 mm), the exit angle θ is about 10.27 degrees. When the X and Y coordinates are (160 mm, 20 mm), the exit angle θ is about 31.53 degrees. When the X and Y coordinates are (160 mm, 180 mm), the exit angle θ is about 52.33 degrees.

As described in Table 1, the exit angle θ differs according to a position of the exiting surface 213, so that positions of virtual light sources differ from each other according to the Y-axis direction of the LGP 210. For example, the position h* of the virtual light source corresponding to the light emitted at about 20 mm of the Y-coordinate is about 275.5±2.8 mm, the position h* of the virtual light source corresponding to the light emitted at about 100 mm of the Y-coordinate is about 214±3 mm, and the position h* of the virtual light source corresponding to the light emitted at about 180 mm of the Y-coordinate is about 146±3.5 mm. The position of the virtual light source is set to be a virtual position at which virtual lines meet, and the virtual lines are extended in opposite directions to the light proceeding directions of the light proceeding from the same Y-coordinate to the X-axis.

Therefore, in order to condense the light emitted from the exiting surface 213 of the LGP into the eyes of the observer, a lens has a focal distance which differs according to the Y-coordinate of the LGP 210. For example, when the Y-coordinate is about 20 mm, the lens has the focal distance F of about 163 mm, when the Y-coordinate is about 100 mm, the lens has the focal distance F of about 139.6 mm and when the Y-coordinate is about 180 mm, the lens has the focal distance F of about 107 mm.

The exit angle θ and focal distance F differ according to the position of the exiting surface 213. However, as shown in FIG. 5, all the light emitted from the exiting surface 213 is inversely followed so that the position of the virtual light source Hs is determined. The virtual light source Hs is located on the same plan as the exiting surface 213.

The virtual light source Hs is located on the same plane as the exiting surface 213 and directions of the light emitted from the virtual light source Hs may be distributed in a fan shape which has a central axis being the position of the virtual light source Hs. When a reflection minor is disposed in a direction perpendicular to the exit angle of the light emitted from the virtual light source Hs, the light may be condensed into a position in which the observer is spaced apart from the exiting surface 213.

According to the present exemplary embodiment, in the light source assembly having a wedge type LGP 210, a reverse prism pattern may be used in order to change the direction of the light emitted from the exiting surface 213. Thus, as shown in FIG. 6, the light-condensing sheet 270 may include the reverse prism pattern which is extended along the arc of the concentric circle having the same central axis Hc. The central axis Hc may be located on the same line as the position of the virtual light source.

The light-condensing sheet 270 according to the present exemplary embodiment may include a plurality of reverse prism patterns which are extended along arcs of the concentric circles. The light-condensing sheet 270 reflects the light emitted from the exiting surface 213 of the wedge type LGP 210 at a sloped surface of the reverse prism pattern so that the light may be condensed into the position of the observer being spaced apart from the exiting surface 213.

Therefore, the light-condensing sheet 270 according to the present exemplary embodiment may be condensed into the position of the observer in the narrow exit angle mode.

Figure 7:
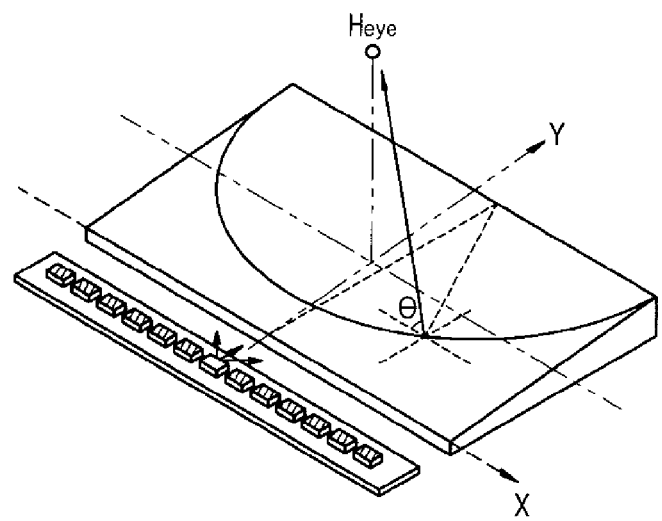
FIG. 7 is a schematic diagram illustrating the light emitting distribution of a narrow exit angle mode according to the light-condensing sheet in FIG. 1.
Figure 8A:
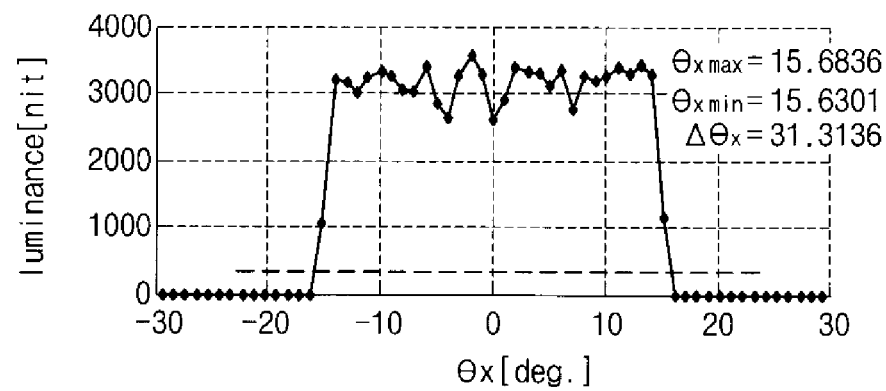
FIG. 8A and FIG. 8B are graphs illustrating the light emitting distribution in the narrow exit angle mode according to the light-condensing sheet in FIG. 1.
Figure 8B:
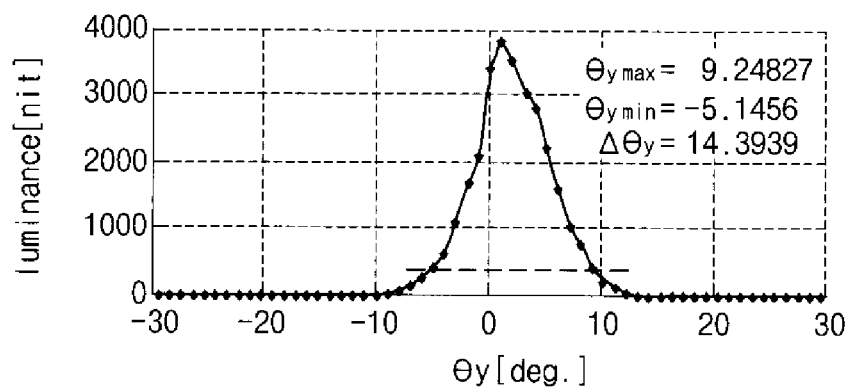
Figure 9A:
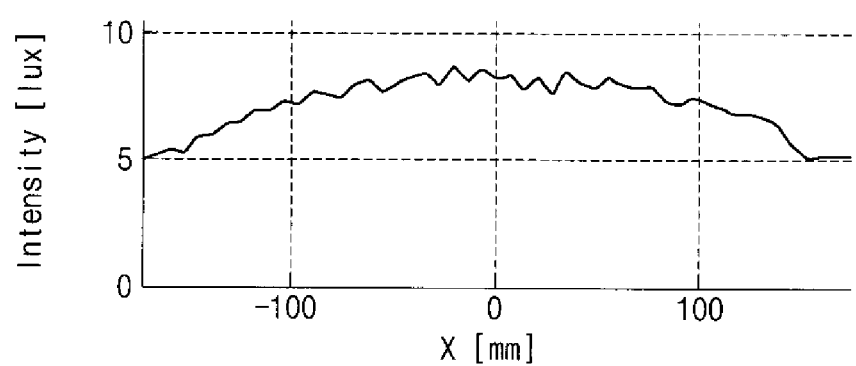
FIG. 9A and FIG. 9B are graphs illustrating a degree of luminance uniformity in the narrow exit angle mode according to the light-condensing sheet in FIG. 1.
Figure 9B:
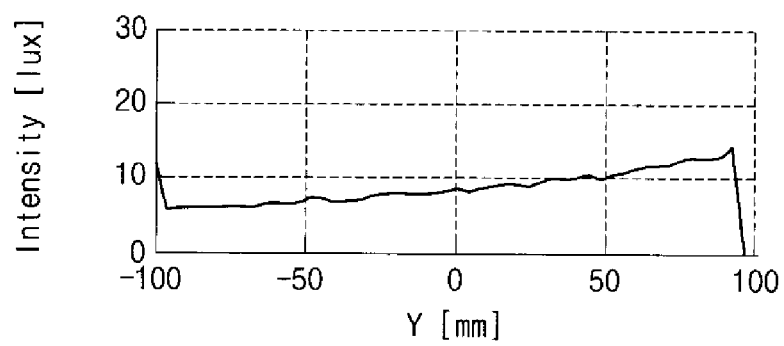

FIG. 7 is a schematic diagram illustrating the light emitting distribution of a narrow exit angle mode according to the light-condensing sheet in FIG. 1. FIGS. 8A and 8B are graphs illustrating the light emitting distribution in the narrow exit angle mode according to the light-condensing sheet in FIG. 1. FIGS. 9A and 9B are graphs illustrating a uniform luminance distribution in the narrow exit angle mode according to the light-condensing sheet in FIG. 1.

Referring to FIGS. 1 and 7, in one exemplary embodiment of the present invention, for example, the light source assembly 200 includes the LGP 210 which has a length along the X-axis direction of about 350 mm and a length along the Y-axis direction being about 200 mm, and the light source part 230 which has 48 LEDs arranged in the X-axis direction. The LEDs have a width of about 4 mm and are spaced apart from each other by about 3 mm.

In the narrow exit angle mode, the light source part 230 is driven so that 17 LEDs, which are adjacent to the central area of the incident surface 211, among 48 LEDs are emitted.

The light emitted from 17 LEDs proceeds from the incident surface 211 to the opposing surface 213, is reflected at the opposing surface 213 and is emitted through the exiting surface 212. The light emitted from the exiting surface 212 is reflected at the reverse prism pattern of the light-condensing sheet 270 extended along the circular arc, so that the reflected light is condensed into eyes Heye of the observer.

In the narrow exit angle mode, an exit angle distribution of the light emitted from the light-condensing sheet 270 is measured.

Referring to FIG. 8A, a maximum exit angle θx_max with respect to the X-axis direction of the LGP 210 is about +15.6836 degrees and a minimum exit angle θx_min with respect to the X-axis direction of the LGP 210 is about −15.6301 degrees with respect to the X-axis direction of the LGP 210. An exit angle difference Δθx between the maximum exit angle θx_max and the minimum exit angle θx_min with respect to the X-axis direction of the LGP 210, is about 31.3136 degrees.

Referring to FIG. 8B, a maximum exit angle θy_max with respect to the Y-axis direction of the LGP 210 is about +9.24827 degrees, and a minimum exit angle θy_min with respect to the Y-axis direction of the LGP 210 is about −5.1456 degrees. A exit angle difference Δθy between the maximum exit angle θy_max and the minimum exit angle θy_min with respect to the Y-axis direction, is about 14.3939 degrees.

A left-right viewing angle may be defined as the exit angle distribution in the X-axis direction. In the narrow exit angle mode, the left-right viewing angle θw is about ±18 degrees.

Therefore, in the narrow exit angle mode, a narrow left-right viewing angle may be obtained by the light-condensing sheet 270.

FIG. 9A is a graph illustrating a luminance distribution in the X-axis direction, and FIG. 9B is a graph illustrating a luminance distribution in the Y-axis direction. Referring to FIGS. 9A and 9B, the luminance distribution in the X-axis direction is relatively increased in a middle section and is generally uniform. The uniform luminance distribution in the Y-axis direction is generally uniform.

In addition, a degree of luminance uniformity is measured at the position of the observer which is spaced apart from the light-condensing sheet 270 by about 400 mm. In one exemplary embodiment, for example, the degree of luminance uniformity may be determined by measuring the luminance of the preset points in a screen of the display apparatus.

The degree of luminance uniformity corresponding to an upper section of the light-condensing sheet 270 is about 24% when 13 points are preset in the upper section and about 49% when 9 points are preset in the upper section. The degree of luminance uniformity described above may be similar to that of a display apparatus using a veil-view sheet for the narrow exit angle mode.

The degree of luminance uniformity described above is a degree of luminance uniformity of the display apparatus without taking into account the diffusion sheet which is disposed on the light-condensing sheet 270. Thus, the degree of luminance uniformity of the display apparatus including the diffusion sheet may be increased. In addition, when the incident surface 211 of the LGP 210 includes a pattern or an optical energy is adjusted according to the position of the LGP 210, the degree of luminance uniformity may be increased.

Therefore, the uniform luminance may be fully obtained by the light-condensing sheet 270 in the narrow exit angle mode.

Figure 10:
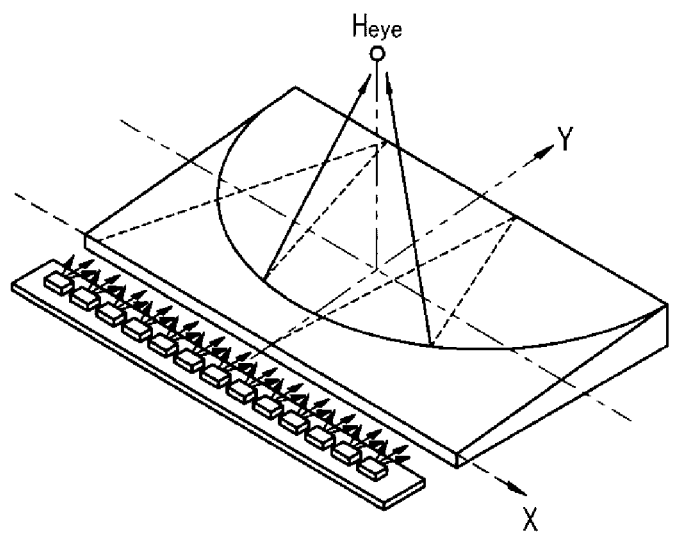
FIG. 10 is a schematic diagram illustrating the light emitting distribution of a wide exit angle mode according to the light-condensing sheet in FIG. 1.
Figure 11A:
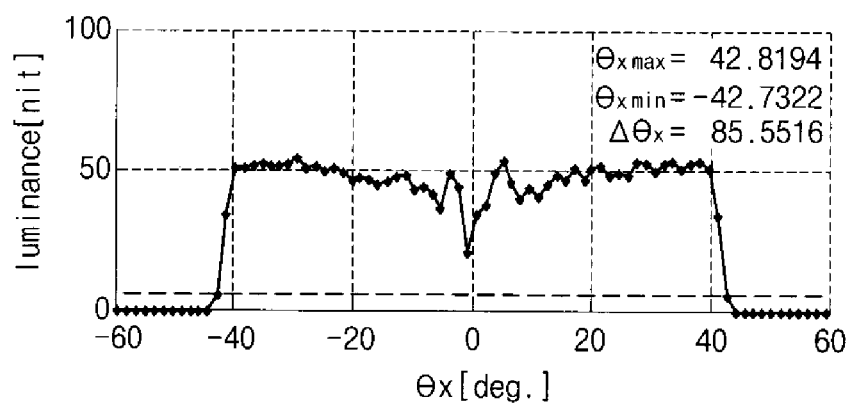
FIG. 11A and FIG. 11B are graphs illustrating the light emitting distribution in a wide exit angle mode according to the light-condensing sheet in FIG. 1.
Figure 11B:
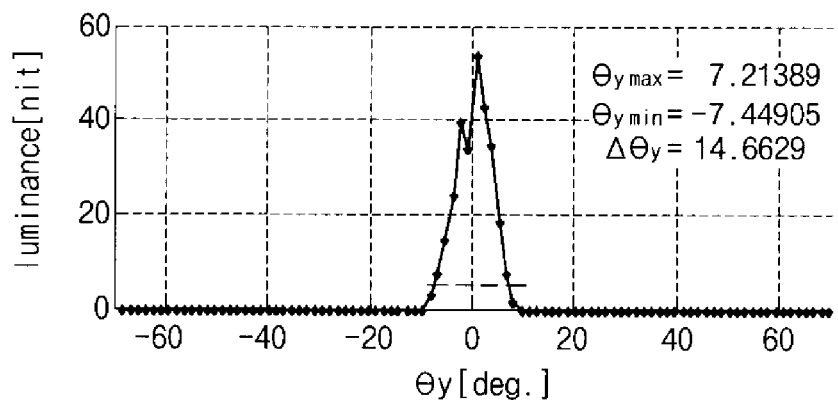

FIG. 10 is a schematic diagram illustrating the light emitting distribution of a wide exit angle mode according to the light-condensing sheet in FIG. 1. FIGS. 11A and 11B are graphs illustrating the light emitting distribution in the wide exit angle mode according to the light-condensing sheet in FIG. 1.

Referring to FIGS. 1 and 10, in an exemplary embodiment of the present invention, for example, the light source assembly 200 includes the LGP 210 which has a length in the X-axis direction of about 350 mm and a length in the Y-axis direction of about 200 mm, and the light source part 230 which has 48 LEDs arranged in the X-axis direction. Each of the LEDs has a width of about 4 mm and the LEDs are spaced apart from each other by about 3 mm.

In wide exit angle mode, the light source part 230 is driven so that all 48 LEDs emit the light.

The light emitted from 48 LEDs proceeds from the incident surface 211 to the opposing surface 213, is reflected at the opposing surface 213 and is emitted through the exiting surface 212. The light emitted from the exiting surface 212 is reflected at the reverse prism pattern of the light-condensing sheet 270 extended along the circular arc so that the reflected light is condensed into eyes Heye of the observer.

In the wide exit angle mode, an exit angle distribution of the light emitted from the light-condensing sheet 270 is measured.

Referring to FIG. 11A, a maximum exit angle θx_max with respect to the X-axis direction of the LGP 210 is about +42.81940 degrees, and a minimum exit angle θx_min with respect to the X-axis direction of the LGP 210 is about −42.7322 degrees. An exit angle difference Δθx between the maximum exit angle θx_max and the minimum exit angle θx_min with respect to the X-axis direction, is about 85.5516 degrees.

Referring to FIG. 11B, a maximum exit angle θy_max with respect to the Y-axis direction of the LGP 210 is about +7.21389 degrees, and a minimum exit angle θy_min with respect to the Y-axis direction of the LGP 210 is about −7.44905 degrees. An exit angle difference Δθy between the maximum exit angle θy_max and the minimum exit angle θy_min with respect to the Y-axis direction, is about 14.6629 degrees.

The left-right viewing angle may be defined as the exit angle distribution in the X-axis direction. In the narrow exit angle mode, the left-right viewing angle θw is about ±43 degrees.

Therefore, in the wide exit angle mode, a wide left-right viewing angle may be obtained by the light-condensing sheet 270 and a full degree of luminance uniformity may be obtained by the light-condensing sheet 270.

Figure 12:
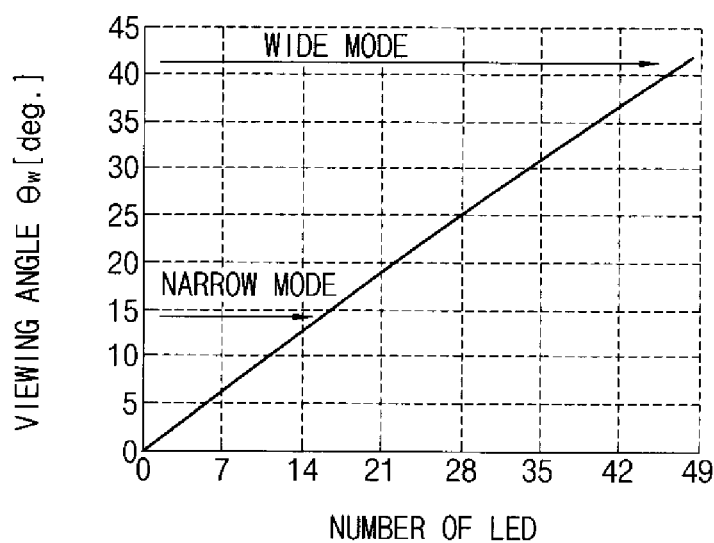
FIG. 12 is a graph illustrating a left-right viewing angle distribution according to the number of light sources in FIG. 11.

FIG. 12 is a graph illustrating a left-right viewing angle distribution according to the number of a light source in FIG. 11.

Referring to FIGS. 7 and 12, when 17 LEDs, which are adjacent to the central area of the incident surface, emit the light according to the light source assembly shown in FIG. 7, the left-right viewing angle is about ±18 degrees. When 7 LEDs, which are adjacent to the central area of the incident surface, emit the light, the left-right viewing angle is about ±7 degrees. When 28 LEDs, which are adjacent to the central area of the incident surface, emit the light, the left-right viewing angle is about ±25 degrees. Thus, the number of light sources which emit the light may be adjusted according to various narrow exit angle modes.

An adjacent distance between the observer and the people around the observer may be different according to the observer's environment. The various narrow exit angle modes may be preset based on the observer's environment. According to the adjacent distance, the number of light sources which emit the light may be preselected to differ.

In one exemplary embodiment, for example, in the narrow exit angle mode when the adjacent distance is normal, 17 LEDs which are adjacent to the central area of the incident surface, emit the light, so that the left-right viewing angle is about ±18 degrees. In the narrow exit angle mode when the adjacent distance is small, 14 LEDs which are adjacent to the central area of the incident surface, emit the light, so that the left-right viewing angle is about ±13 degrees. In the narrow exit angle mode when the adjacent distance is very small, 7 LEDs which are adjacent to the central area of the incident surface emit the light so that the left-right viewing angle is about ±7 degrees.

As described above, the narrow exit angle mode may be variously preset according to the observer's environment.

Hereinafter, the same reference numerals will be used to refer to the same or like parts as those described in the previous example embodiment, and any repetitive detailed explanation will be omitted.

Figure 13:
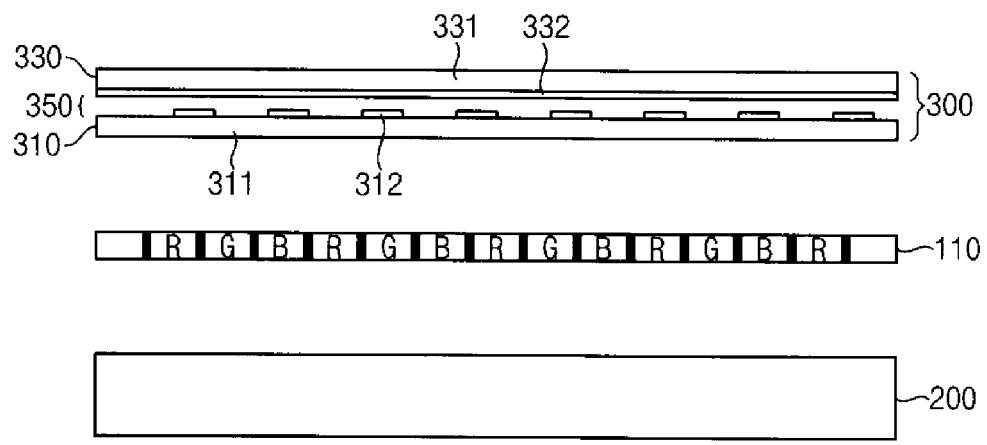
FIG. 13 is a cross-sectional view according to an exemplary embodiment of the present invention.

FIG. 13 is a cross-sectional view a display apparatus of an exemplary embodiment of present invention.

Referring FIGS. 1 and 13, the display apparatus includes a panel assembly 100, a light source assembly 200 and a 2D/3D switching panel 300.

The panel assembly 100 displays a two-dimensional ("2D") image on the display panel 110 in a 2D image mode, and displays a three-dimensional ("3D") image on the display panel 110 in a 3D image mode. The 3D image includes a left-eye image and a right-eye image.

The light source assembly 200 drives the light source part 230 into the wide exit angle mode in the 2D image mode. Thus, a plurality of LEDs LS1, ... LSn, ... , LSm included in the light source part 230 are all driven to emit the light. The light source assembly 200 drives the light source part 230 into the narrow exit angle mode in the 3D image mode. Thus, LEDs LSn-a, ... , LSn, ... , LSn+a preset among the LEDs LS1, ... LSn, ... , LSm are driven to emit the light (n and a are natural numbers).

The 2D/3D switching panel 300 includes a first substrate 310, a second substrate 330 and a liquid crystal layer 350, and is driven according to the 2D and 3D image mode of the display apparatus.

The first substrate 310 includes a first base substrate 311 and a plurality of first electrodes 312 disposed on the first base substrate 311. The first electrodes 312 may be extended in the first direction D1 and arranged in the second direction D2.

The second substrate 330 includes a second base substrate 331 and a second electrode 322 disposed on the second base substrate 331. The second electrode 332 may not be patterned and may form a common electrode corresponding to the first electrodes 312.

The liquid crystal layer 350 is disposed between the first and second substrates 310 and 330.

In the 2D image mode, the 2D/3D switching panel 300 is driven to be in a transparent mode. Thus, the 2D/3D switching panel 300 transmits the 2D image displayed on the display panel 110.

In the 3D image mode, the 2D/3D switching panel 300 is driven to be in a barrier mode. In an exemplary embodiment of the present invention, for example, when voltages are applied to the first electrode 312 of the first substrate 310 and the second electrode 332 of the second substrate 330, the liquid crystal layer 313 between the first and second electrodes 312 and 332 is driven into a barrier mode which blocks the light. Thus, the 2D/3D switching panel 300 includes a transmitted area which is defined by the barrier. The 2D/3D switching panel 300 transmits the left-eye image displayed on the display panel 110 toward the left-eye of the observer through the transmitted area and the right-eye image displayed on the display panel 110 toward the right-eye of the observer through the transmitted area.

According to the present exemplary embodiment, in the 3D image mode, the light source assembly 200 is driven into the narrow exit angle mode described above so that a front luminance of the 3D image may be increased. In addition, only the preselected LEDs included in the light source part 230 are driven so that power consumption may be decreased.

Figure 14A:
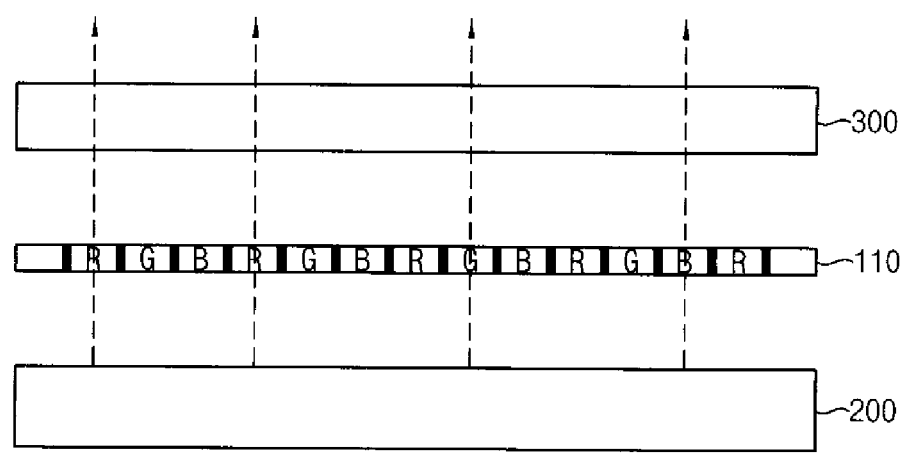
FIG. 14A and FIG. 14B illustrate a method of displaying the two-dimensional image in a 2D image mode according to the display apparatus of FIG. 13, where
Figure 14B:
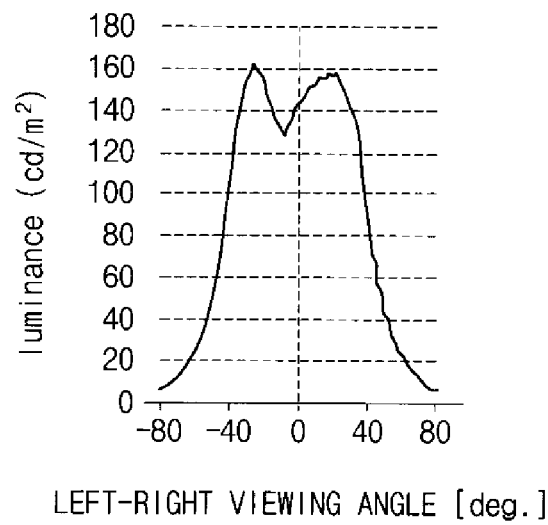

FIGS. 14A and 14B are schematic diagrams illustrating a method of displaying the 2D image in a 2D image mode according to the display apparatus of FIG. 13.

FIG. 14A is a schematic diagram illustrating a method of driving the 2D/3D switching panel in the 2D image mode, and FIG. 14B is a graph diagram illustrating the luminance distribution of the 2D image in the 2D image mode.

Referring to FIG. 14A, in the 2D image mode, the 2D/3D switching panel 300 is substantially turned off. Thus, the voltages are not applied to the first and second electrodes 312 and 332. The 2D/3D switching panel 350 is driven into the transparent mode.

When the display panel 110 displays the 2D image, the 2D/3D switching panel 300 is substantially turned off and the light source assembly 200 is driven into the wide exit angle mode.

Referring to FIG. 14B, in the 2D image mode, the luminance distribution of the 2D image displayed on the display apparatus is about 120 cd/nm2, when the left-right viewing angle is about ±66 degrees.

Therefore, the left-right viewing angle in the left-right direction and the luminance may be increased so that a plurality of viewers may view the display apparatus in the 2D image mode.

Figure 15A:
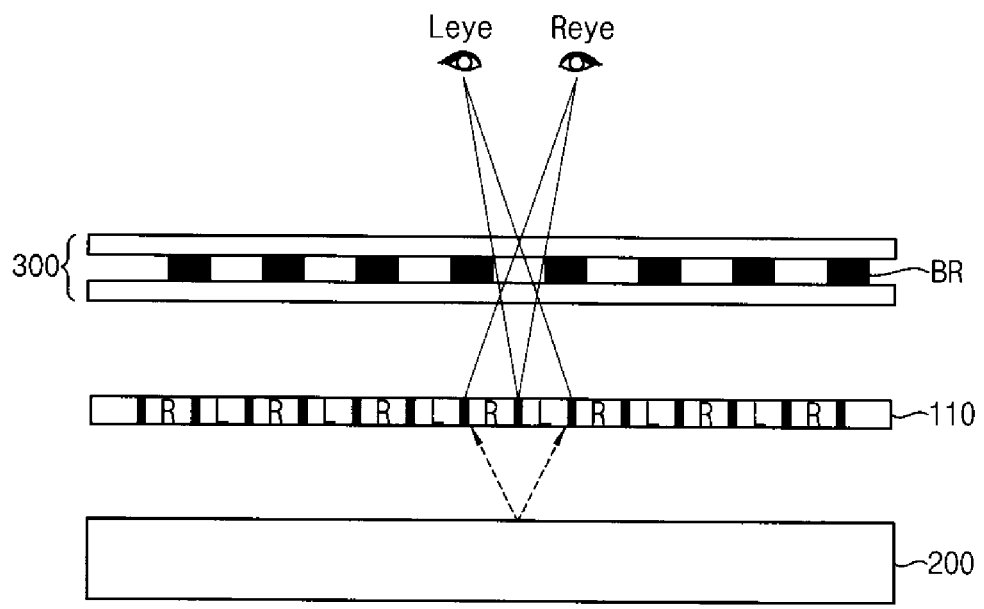
FIG. 15A and FIG. 15B illustrate a method of displaying a 3D image in a 3D image mode according to the display apparatus of FIG. 13, where
Figure 15B:
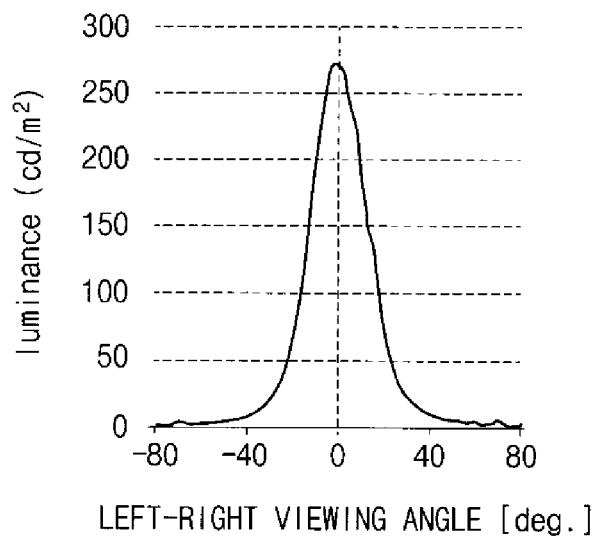

FIGS. 15A and 15B are schematic diagrams illustrating the method of displaying the 3D image in a 3D image mode according to the display apparatus of FIG. 13.

FIG. 15A is a schematic diagram illustrating a method of driving the 2D/3D switching panel in the 3D image mode, and FIG. 15B is a graph diagram illustrating the luminance distribution of the 3D image in the 3D image mode.

Referring to FIG. 15A, in the 3D image mode, the 2D/3D switching panel 300 is substantially turned on. Thus, a first driving voltage is applied to the first electrode 312 and a second driving voltage is applied to the second electrode 332. The liquid crystal layer between the first and second electrodes is driven into the barrier mode which blocks the light. The 2D/3D switching panel 350 is driven into the barrier mode.

When the 3D image, including the left-eye L and right-eye images, is displayed on the display panel 110, the 2D/3D switching panel 300 is substantially turned on and the light source assembly 200 is driven into the narrow exit angle mode.

The 2D/3D switching panel 350 transmits the left-eye image displayed on the display panel 110 toward the left-eye of the observer through the transmitted area of the 2D/3D switching panel 350, which is defined by the barrier, and the right-eye image displayed on the display panel 110 toward the right-eye of the observer through the transmitted area. Thus, the observer may view the 3D image.

Referring to FIG. 15B, in the 3D image mode, the luminance distribution of the 3D image displayed on the display apparatus is about 250 cd/nm2, when the left-right viewing angle is about ±28 degrees. As described in FIG. 14B, the front luminance may be increased as compared with the 2D image mode.

Generally, the display apparatus for the 3D image has a decreased luminance and a limited viewing angle. The display apparatus according to the present exemplary embodiment may have the limited viewing angle, but the front luminance may be increased and the power consumption may be decreased.

Figure 16:
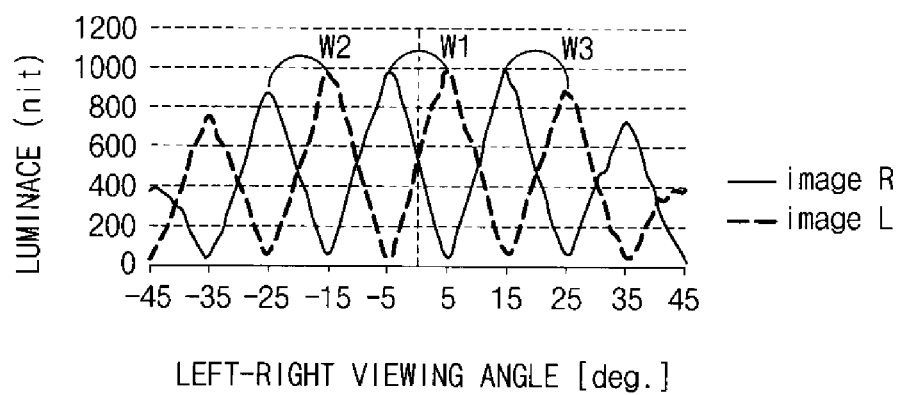
FIG. 16 is a graph illustrating a luminance distribution of the left-eye and right-eye images according to an exit angle distribution of the display apparatus in FIG. 13.

FIG. 16 is a graph diagram illustrating a luminance distribution of the left-eye and right-eye images according to an exit angle distribution of the display apparatus of FIG. 13.

Referring to FIG. 16, when the light source assembly 200 is driven in the narrow exit angle mode having the left-right viewing angle of about ±30 degrees, the panel assembly 100 and the 2D/3D switching panel 300 are driven in the 3D image mode. In this case, the luminance distribution of the left-eye and right-eye images displayed on the display apparatus is measured.

In a first view W1 having the front exit angle of about ±5 degrees, the luminance distribution of the left-eye and right-eye images is about 1000 nit. In a second view W2 having a left exit angle of about −25 degrees to about −15 degrees, the luminance distribution of the left-eye and right-eye images is about 900 nit. The left exit angle may be shifted with respect to the first view W1. In a third view W3 having a right exit angle of about +15 degrees to about +25 degrees shifted with respect to the first view W1, the luminance distribution of the left-eye and right-eye images is about 900 nit.

A display quality of the 3D image is excellent in the first view W1, and is good in the second and third views W2 and W3, respectively shifted to left and right sides with respect to the first view W1.

The 3D image may be viewed with the good display quality in the first, second and third views W1, W2 and W3. Therefore, when the light source assembly 200 is driven in the narrow exit angle mode, at least three observers may view the 3D image. The number of the LEDs emitting the light may be adjusted so that the number of viewers viewing the 3D image may be adjusted.

Figure 17:
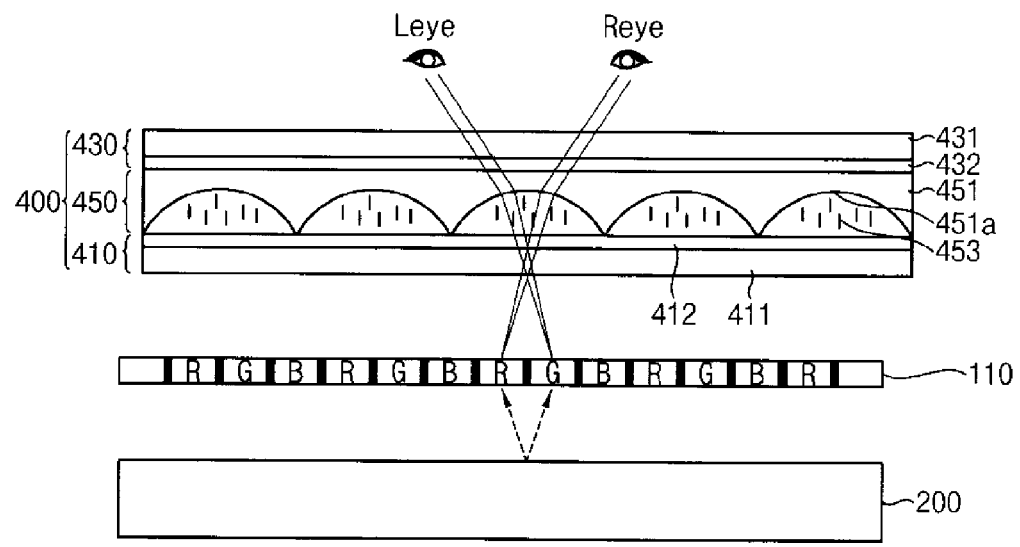
FIG. 17 is a cross-sectional view according to another exemplary embodiment of the present invention.

FIG. 17 is a cross-sectional view of a display apparatus of an exemplary embodiment of the present invention.

Referring to FIGS. 1 and 17, the display apparatus includes a panel assembly 100, a light source assembly 200 and a 2D/3D switching panel 400.

The panel assembly 100 displays a 2D image on the display panel 110 in a 2D image mode, and displays a 3D image on the display panel 110 in a 3D image mode. The 3D image includes a left-eye image and a right-eye image.

The light source assembly 200 drives the light source part 230 into the wide exit angle mode in the 2D image mode. Thus, a plurality of LEDs LS1, . . . LSn, . . . , LSm included in the light source part 230 are all driven to emit the light. The light source assembly 200 drives the light source part 230 into the narrow exit angle mode in the 3D image mode. Thus, LEDs LSn-a, . . . , LSn, . . . , LSn+a preset among the LEDs LS1, . . . LSn, . . . , LSm are driven to emit the light (n and a are natural numbers).

The 2D/3D switching panel 400 includes a first substrate 410, a second substrate 430 and a lens layer 450, and is driven according to the 2D or 3D image mode.

The first substrate 410 includes a first base substrate 411 and a first electrode 412 disposed on the first base substrate 411.

The second substrate 430 includes a second base substrate 431 and a second electrode 432 disposed on the second base substrate 431.

The lens layer 450 includes a concave layer 451 and a liquid crystal layer 453. The concave layer 451 includes a plurality of concave parts 451a. The concave parts 451a may be extended in the first direction D1 and arranged in the second direction D2. The liquid crystal layer 453 is disposed in a space which is defined as the concave parts 451a.

In the 2D image mode, the 2D/3D switching panel 400 is driven in the transparent mode. Thus, the 2D/3D switching panel 400 transmits the 2D image displayed on the display panel 110. In the 3D image mode, the 2D/3D switching panel 400 is driven to function as a lens panel. In one exemplary embodiment, for example, when voltages are applied to the first electrode 412 of the first substrate 410 and the second electrode 432 of the second substrate 430, the liquid crystal layer 453 between the first and second electrodes 412 and 432 is arranged with the predetermined angle. Therefore, the 2D/3D switching panel 300 transmits the left-image displayed on the display panel 110 toward the left-eye of the observer through the lens layer 450, and transmits the right-image displayed on the display panel 110 toward the right-eye of the observer through the lens layer 450. Thus, the observer may view the 3D image.

According to the present exemplary embodiment, in the 3D image mode, the light source assembly 200 is driven into the narrow exit angle mode described above so that a front luminance of the 3D image may be increased. In addition, the preselected LEDs included in the light source part 230 are driven so that power consumption may be decreased.

Figure 18:
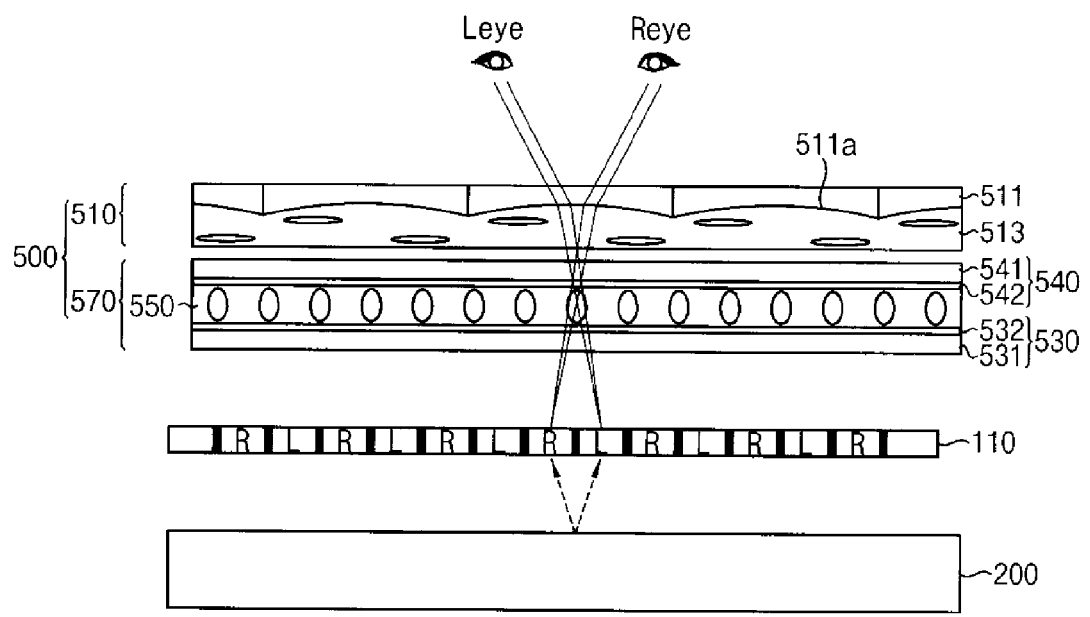
FIG. 18 is a cross-sectional view according to another exemplary embodiment of the present invention.

FIG. 18 is a cross-sectional view of a display apparatus according to an exemplary embodiment of the present invention.

Referring to FIGS. 1 and 18, the display apparatus includes a panel assembly 100, a light source assembly 200 and a 2D/3D switching panel 500.

The panel assembly 100 displays a 2D image on the display panel 110 in a 2D image mode, and displays a 3D image on the display panel 110 in a 3D image mode. The 3D image includes a left-eye image and a right-eye image.

The light source assembly 200 drives the light source part 230 into the wide exit angle mode in the 2D image mode. Thus, a plurality of LEDs LS1, . . . LSn, . . . , LSm included in the light source part 230 are all driven to emit the light. The light source assembly 200 drives the light source part 230 into the narrow exit angle mode in the 3D image mode. Thus, LEDs LSn-a, . . . , LSn, . . . , LSn+a preset among the LEDs LS1, . . . LSn, . . . , LSm are driven to emit the light (n and a are natural numbers).

The 2D/3D switching panel 500 includes a polarizing lens panel 510 and a polarizing switching panel 570.

The polarizing lens panel 510 includes a concave layer 511 and a polarizing liquid crystal layer 513.

The concave layer 511 includes a plurality of concave parts 511a. The concave parts 511a may extend in the first direction D1 and may be arranged in the second direction D2. The polarizing liquid crystal layer 513 is disposed in the space which is defined as the concave parts 511a and has a polarization axis. The polarizing lens panel 510 refracts the light having the same light axis as the polarization axis of the polarizing liquid crystal layer 513 and transmits the light having a different light axis from the polarization axis of the polarizing liquid crystal layer 513.

The polarizing switching panel 570 includes a first substrate 530, a second substrate 540 and a liquid crystal layer 550, and drives according to the 2D and 3D image mode of the display apparatus.

The first substrate 530 includes a first base substrate 531 and a first electrode 532 disposed on the first base substrate 531.

The second substrate 540 includes a second base substrate 541 and a second electrode 542 disposed on the second base substrate 541.

The liquid crystal layer 550 is disposed between the first and second substrates 530 and 540.

In the 2D image mode, the driving voltages are not applied to the polarizing switching panel 570 so that the polarizing switching panel 570 is turned off. Thus, the polarizing switching panel 570 transmits the light transmitted from the display panel 110. In 3D image mode, the driving voltages are applied to the first and second electrodes 532 and 542 so that the polarizing switching panel 570 is turned on. Thus, the polarizing switching panel 570 switches the light axis of the light transmitted from the display panel 110 into the polarization axis of the polarizing liquid crystal layer 513.

According to the present exemplary embodiment, in the 2D image mode, the light transmitted from the display panel 110 is transmitted the polarizing switching panel 570 and the polarizing lens panel 510. Thus, the observer may view the 2D image.

However, in the 3D image mode, the light transmitted from the display panel 110 is switched into the same light axis as the polarization axis of the polarizing liquid crystal layer 513 through the polarizing switching panel 570, and refracted through the polarizing lens panel 510 to be transmitted. Therefore, the left-eye image is transmitted toward the left-eye of the observer and the right-eye image is transmitted toward the right-eye of the observer, so that the observer may view the 3D image.

According to the present exemplary embodiment, in the 3D image mode, the light source assembly 200 is driven into the narrow exit angle mode described above so that a front luminance of the 3D image may be increased. In addition, the preset LEDs preset among the entire LEDs included in the light source part 230 are driven so that power consumption may be decreased.

Figure 19:
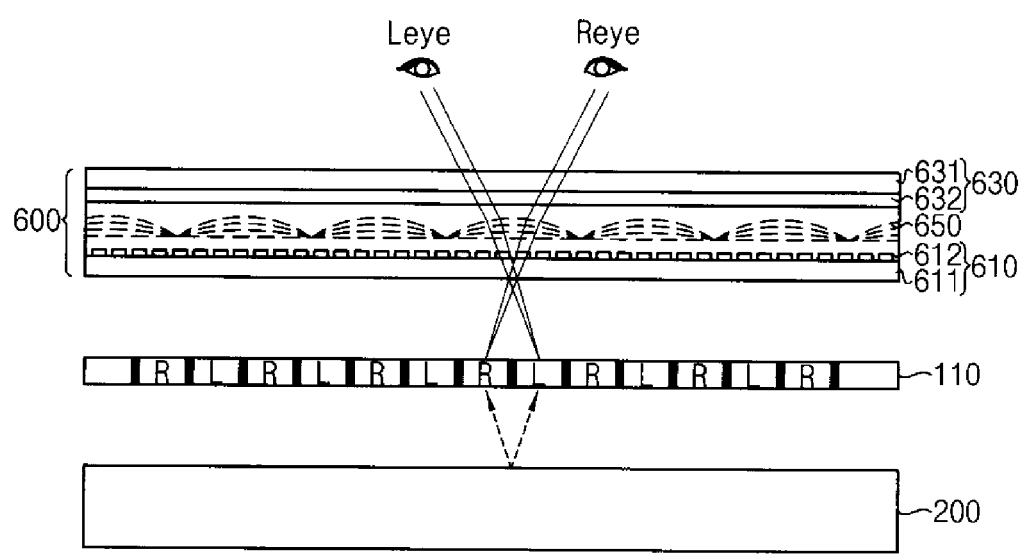
FIG. 19 is a cross-sectional view according to another exemplary embodiment of the present invention.

FIG. 19 is a cross-sectional view of a display apparatus of an exemplary embodiment of the present invention.

Referring to FIGS. 1 and 19, the display apparatus includes a panel assembly 100, a light source assembly 200 and a 2D/3D switching panel 600.

The panel assembly 100 displays a 2D image on the display panel 110 in a 2D image mode, and displays a 3D image on the display panel 110 in a 3D image mode. The 3D image includes a left-eye image and a right-eye image.

The light source assembly 200 drives the light source part 230 into the wide exit angle mode in the 2D image mode. Thus, a plurality of LEDs LS1, ... LSn, ..., LSm included in the light source part 230 are all driven to emit the light. The light source assembly 200 drives the light source part 230 into the narrow exit angle mode in the 3D image mode. Thus, LEDs LSn-a, ..., LSn, ..., LSn+a preset among the LEDs LS1, ... LSn, ..., LSm are driven to emit the light (n and a are natural numbers).

The 2D/3D switching panel 600 includes a first substrate 610, a second substrate 630 and the liquid crystal layer 650, and drives according to the 2D or 3D image mode of the display apparatus.

The first substrate 610 includes a first base substrate 611 and a plurality of first electrodes 612 disposed on the first base substrate 611. The first electrodes 612 may extend in the first direction D1 and may be arranged in the second direction D2.

The second substrate 630 includes a second base substrate 631 and a second electrode 632 disposed on the second base substrate 631. The second electrode 632 may be not patterned.

The liquid crystal layer 650 is disposed between the first and second substrates 610 and 630.

In the 2D image mode, the 2D/3D switching panel 600 is driven such as a transparent panel. Thus, the 2D/3D switching panel 600 transmits the 2D image displayed on the display panel 110.

In the 3D image mode, the 2D/3D switching panel 600 is driven to function as a liquid crystal lens panel. In one exemplary embodiment, for example, a first driving voltage is applied to the first electrode 612 of the first substrate 610 and a second driving voltage is applied to the second electrode 632. The liquid crystal layer 650 is driven into a liquid crystal lens unit by the first and second driving voltages applied to the first and second electrodes 612 and 632. Therefore, the 2D/3D switching panel 600 transmits the left-image displayed on the display panel 110 toward the left-eye of the observer through the lens layer 450, and transmits the right-image displayed on the display panel 110 toward the right-eye of the observer through the lens layer 450. Thus, the observer may view the 3D image.

According to the present exemplary embodiment, in the 3D image mode, the light source assembly 200 is driven into the narrow exit angle mode described above so that a front luminance of the 3D image may be increased. In addition, the preselected LEDs included in the light source part 230 are driven so that power consumption may be decreased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A light source assembly comprising:
a light source part configured to generate light and comprising at least one light source;
a light guide plate comprising an incident surface to which the light is incident, an opposing surface which is opposite the incident surface, and an exiting surface which emits the light, and comprising a thickness which gradually increases from the incident surface to the opposing surface; and
a light-condensing sheet disposed adjacent the exiting surface of the light guide plate, the light-condensing sheet comprising a plurality of prism patterns which protrude toward the exiting surface, extend along an arc of a circle, and are arranged in a concentric circle structure, wherein:
the light-condensing sheet is configured to receive and condense the light emitted from the exiting surface of the light guide plate; and
the concentric circle structure of the prism patterns has a radius which gradually increases from the opposing surface to the incident surface.

2. The light source assembly of claim 1, wherein concentric circles of the concentric circle structure comprise a central axis which is located on a line substantially perpendicular to a central line of the incident surface.

3. The light source assembly of claim 1, wherein the light source part comprises a plurality of light emitting diodes which are arranged along a longitudinal direction of the incident surface.

4. The light source assembly of claim 3, wherein all the light emitting diodes of the light source part emit light in a wide exit angle mode, and
wherein a portion of the light emitting diodes of the light source part in a central area of the incident surface emit light in a narrow exit angle mode.

5. The light source assembly of claim 1, further comprising a reflection layer disposed on the opposing surface.

6. The light source assembly of claim 1, further comprising a zig-zag pattern formed on the opposing surface.

7. The light source assembly of claim 1, further comprising a diffusion sheet disposed on the light-condensing sheet and configured to diffuse the light emitted from the light-condensing sheet.

8. A display apparatus comprising:
a display panel configured to display an image; and
a light source assembly comprising:
a light source part configured to generate light and comprising a plurality of light emitting diodes;
a light guide plate comprising an incident surface to which the light is incident, an opposing surface which is opposite the incident surface, and an exiting surface which emits the light, and comprising a thickness which gradually increases from the incident surface toward the opposing surface; and
a light-condensing sheet disposed adjacent the exiting surface of the light guide plate, the light-condensing sheet comprising a plurality of prism patterns which protrude toward the exiting surface, extended along an arc of a circle, and are arranged in a concentric circle structure, wherein:
the light-condensing sheet is configured to receive and condense the light emitted from the exiting surface of the light guide plate; and
the concentric circle structure of the prism patterns has a radius which gradually increases from the opposing surface to the incident surface.

9. The display apparatus of claim 8, wherein the light guide plate further comprises:
a reflection layer disposed on the opposing surface; and
a zig-zag pattern formed on the opposing surface.

10. The display apparatus of claim 8, wherein the light emitting diodes are arranged along a longitudinal direction of the incident surface.

11. The display apparatus of claim 8, wherein the light source assembly is configured such that all the light emitting diodes emit light in a wide exit angle mode and at least one light emitting diode located in a central area of the incident surface emits light in a narrow exit angle mode.

12. The display apparatus of claim 8, wherein the light source assembly further comprises a diffusion sheet disposed on the light-condensing sheet and is configured to diffuse the light emitted from the light-condensing sheet.

13. The display apparatus of claim 8, wherein the light source assembly is configured such that all the light emitting diodes emit light in a 2D image mode and at least one light emitting diode located in a central area of the incident surface emits light in a 3D image mode.

14. The display apparatus of claim 8, further comprising a 2D/3D switching panel configured to transmit a 2D image displayed on the display panel, and to transmit a left-eye image and a right-eye image displayed on the display panel toward a left-eye and a right-eye of an observer.

15. The display apparatus of claim 14, wherein the 2D/3D switching panel comprises:
a first substrate comprising a first electrode;
a second substrate comprising a second electrode and disposed opposite the first substrate;
a liquid crystal layer disposed between the first and second substrates; and
a plurality of barriers extending in a first direction and disposed in a second direction crossing the first direction in the 3D image mode, and a transmitted area which is defined by the barriers transmits the left-eye image toward the left-eye and the right-eye image toward the right-eye.

16. The display apparatus of claim 14, wherein the 2D/3D switching panel comprises:
a first substrate comprising a first electrode;
a second substrate comprising a second electrode and disposed opposite the first substrate;
a lens layer disposed between the first and second substrates, comprising a concave layer which comprises a plurality of concave parts and a liquid crystal layer disposed in a space defined by the concave parts; and
a lens for the 3D image in the 3D image mode, the lens for the 3D image transmitting the left-eye image toward the left-eye and the right-eye image toward the right-eye.

17. The display apparatus of claim 14, wherein the 2D/3D switching panel comprises:
a polarizing lens panel comprising a concave layer comprising a plurality of concave parts and a polarizing liquid crystal layer disposed in a space which is defined by the concave parts and has a polarizing axis; and
a polarizing switching panel comprising a first substrate comprising a first electrode, a second substrate comprising a second electrode and disposed opposite the first substrate, and a liquid crystal layer disposed between the first and second substrates,
wherein, in the 3D image mode, the polarizing switching panel is configured to switch the light transmitted from the display panel into the same light axis as the polarizing axis of the polarizing liquid crystal layer, and the polarizing lens panel is configured to refract the light transmitted from the polarizing liquid crystal layer such that the left-eye image is transmitted toward the left-eye and the right-eye image is transmitted toward the right-eye.

18. The display apparatus of claim 14, wherein the 2D/3D switching panel comprises:
a first substrate comprising a first electrode;
a second substrate comprising a second electrode and disposed opposite the first substrate;
a liquid crystal layer disposed between the first and second substrates; and
a liquid crystal lens unit and, in the 3D image mode, the liquid crystal lens unit is configured to transmit the left-eye image toward the left-eye and the right-eye image toward the right-eye.

19. A light source assembly comprising:
a light source part configured to generate light and comprising at least one light source;
a light guide plate comprising an incident surface to which the light is incident, an opposing surface which is opposite the incident surface, an exiting surface which emits the light, and a rear surface opposing the exiting surface, in which a distance between the exiting surface and the rear surface gradually increases from the incident surface to the opposing surface; and
a light-condensing sheet disposed adjacent the exiting surface of the light guide plate, the light-condensing sheet comprising a plurality of prism patterns which protrude toward the exiting surface, extend along an arc of a circle, and are arranged in a concentric circle structure, wherein:
the light-condensing sheet is configured to receive and condense the light emitted from the exiting surface of the light guide plate; and
the concentric circle structure of the prism patterns has a radius which gradually increases from the opposing surface to the incident surface.

* * * * *